United States Patent [19]
Yaneyama

[11] Patent Number: 5,221,995
[45] Date of Patent: Jun. 22, 1993

[54] ZOOM LENS SYSTEM

[75] Inventor: Shuhji Yaneyama, Tokyo, Japan

[73] Assignee: Asahi Kogaku Kogyo K.K., Tokyo, Japan

[21] Appl. No.: 988,003

[22] Filed: Dec. 9, 1992

Related U.S. Application Data

[63] Continuation of Ser. No. 564,525, Aug. 9, 1990, abandoned.

[30] Foreign Application Priority Data

Aug. 12, 1989 [JP] Japan .................. 1-208688

[51] Int. Cl.$^5$ ............................................. G02B 15/14
[52] U.S. Cl. ..................................... 359/688; 359/740
[58] Field of Search ................. 350/423, 427, 450; 359/688, 740

[56] References Cited

U.S. PATENT DOCUMENTS

| | | | |
|---|---|---|---|
| 4,200,358 | 4/1980 | Tsuji et al. | 359/688 X |
| 4,303,312 | 12/1981 | Basista | 350/427 |
| 4,629,293 | 12/1986 | Mihara | 359/688 |
| 4,832,471 | 5/1989 | Haman | 359/688 X |
| 4,871,240 | 10/1989 | Suda | 359/688 |

FOREIGN PATENT DOCUMENTS 61-213816 9/1986 Japan .
62-242114 2/1987 Japan .

Primary Examiner—Scott J. Sugarman
Attorney, Agent, or Firm—Sughrue, Mion, Zinn, Macpeak & Seas

[57] ABSTRACT

A zoo comprises, in order from the object side, a first lens group having a positive refractive power that moves along the optical axis for focusing, a second lens group having a negative refractive power that moves along the optical axis for zooming, a third lens group having a negative refractive power that moves along the optical axis for compensating for the image plane that varies upon zooming, and a fixed, imaging fourth lens group having a positive refractive power. The fourth lens group has an aperture and comprises a first sub-group having a positive refractive power and a second sub-group having a positive refractive power, which fourth lens group further satisfies certain conditions.

13 Claims, 6 Drawing Sheets

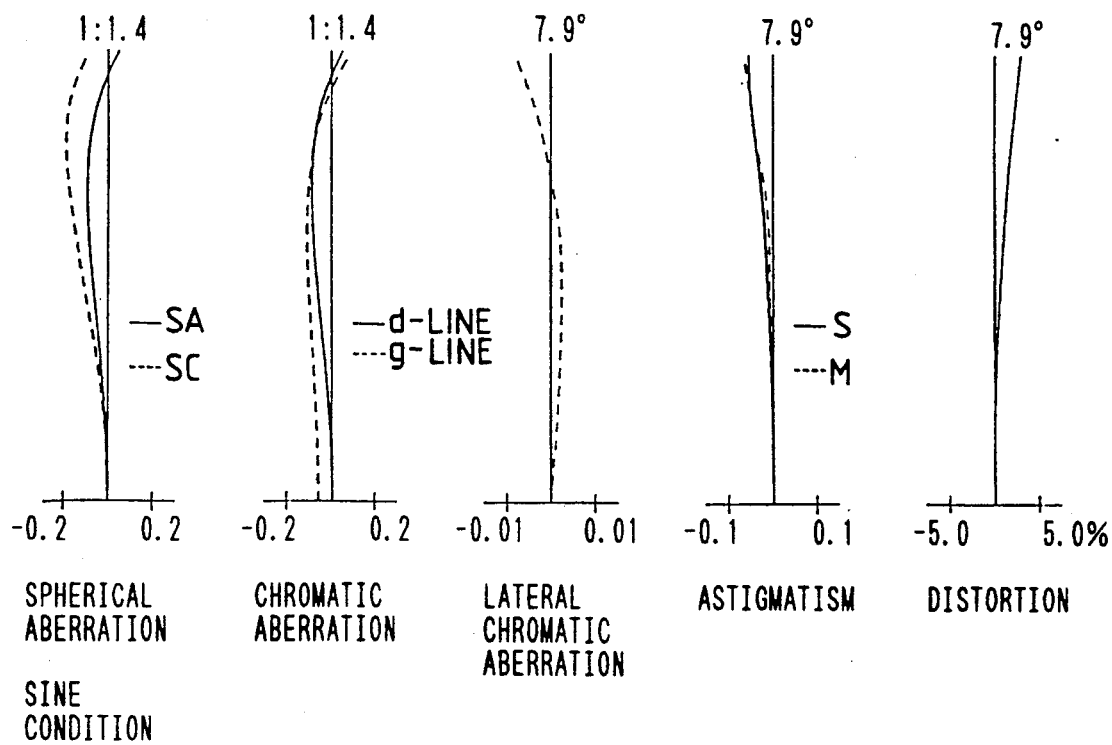
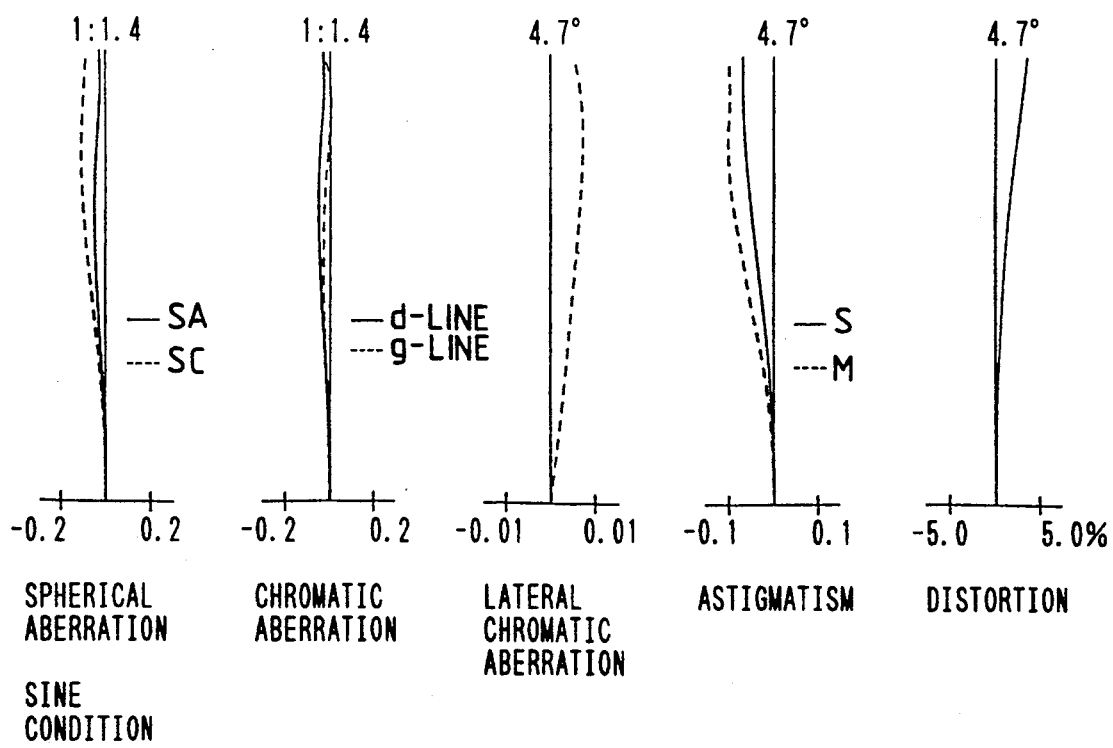

ZOOM LENS SYSTEM

This is a continuation of application Ser. No. 07/564,525 filed Aug. 9, 1990, now abandoned.

BACKGROUND OF THE INVENTION

This invention relates to a zoom lens system. More particularly, it relates to a zoom lens system that is suitable for use with a small video camera, e.g., with an image size of ½ inch, that can be manufactured at a relatively low cost, that is compact and which yet is bright and capable of zooming at a ratio of up to about 6.

With the recent expanded use of small video cameras, a need has arisen to use as an imaging lens a zoom lens that is bright, that is capable of high zooming ratio, that is compact and which yet can be manufactured at low cost. Among the zoom lens systems that have been developed with a view to meeting this need are those which are described in Unexamined Published Japanese Patent Application Nos. 213816/1986 and 24214/1987.

In these conventional zoom lens systems, aspheric surfaces are used to reduce the number of lens elements, whereby the need for compactness and low cost is partly met. However, aspheric surfaces are generally more difficult to produce than spherical surfaces. Further, the resulting lens systems are not completely satisfactory in terms of compactness.

SUMMARY OF THE INVENTION

Accordingly, a principal object of the present invention is to provide a zoom lens system that is suitable for use with a small video camera, that can be manufactured at a relatively low cost, that is compact and which yet is bright and capable of zooming at a ratio of up to about 6.

The zoom lens system of the present invention which attains this object comprises basically, in order from the object side, a first lens group having a positive refractive power that moves along the optical axis for focusing, a second lens group having a negative refractive power that moves along the optical axis for zooming, a third lens group having a negative refractive power that moves along the optical axis for compensating for the image plane that varies upon zooming, and a fixed, imaging fourth lens group having a positive refractive power. This lens system is characterized in that the fourth lens group has an aperture and comprises a sub-group 4a having a positive refractive power and a sub-group 4b having a positive refractive power which fourth lens group further satisfies the following conditions:

$$0.3 < \frac{f_W}{f_{IV}} < 0.7 \quad (1)$$

$$0.9 < \frac{f_{IV}}{f_{IVa}} < 1.3; \text{ and} \quad (2)$$

preferably, the fourth lens group meeting the following conditions:

$$1.0 < \frac{d_{IV1-A}}{f_W} < 2.3 \quad (3)$$

$$0.4 < \frac{HH_{IVa}}{f_W} < 0.9 \quad (4)$$

where $f_W$ is the focal length of the overall system at the wide-angle end, $f_{IV}$ is the focal length of the fourth lens group, $f_{IVa}$ is the focal length of the sub-group 4a, $d_{IV1-A}$ is the distance from the first surface of sub-group 4a to the aperture, and $HH_{IVa}$ is the distance between the principal points in the sub-group 4a of the fourth lens group.

Preferably, the sub-group 4a is composed of at least two positive lens elements and at least one negative lens element. More preferably, it comprises, in order from the object side, a positive lens element having a convex surface of a strong curvature directed toward the image, a positive lens element having a convex surface of a strong curvature directed toward the object, and a negative lens element having a concave surface of a strong curvature directed toward the object, and satisfies the following condition:

$$-0.6 < \frac{f_{IV}}{f_{IVaN}} < -0.2 \quad (5)$$

where $$\frac{1}{f_{IVaN}} = \frac{n_{IVaN} - 1}{r_{IVaN}}$$

is the power of the divergent surface on the object side of the negative lens element in the sub-group 4a, $n_{IVaN}$ is the refractive index at the d-line of the negative lens element in the sub-group 4a, and $r_{IVaN}$ is the radius of curvature of the surface on the object side of the negative lens element in the sub-group 4a.

It is also preferred that the sub-group 4b comprises, in order from the object side, a negative meniscus lens having a convex surface directed toward the object and a biconvex positive lens element, which sub-group 4b further satisfies the following conditions:

$$-2.0 < \frac{f_{IV}}{f_{IVbN}} < -1.0 \quad (6)$$

$$1.0 < \frac{l_{IVa-IVb}}{f_W} < 2.0 \quad (7)$$

where $$\frac{1}{f_{IVbN}} = \frac{1 - n_{IVbN}}{r_{IVbN}}$$

is the power of the divergent surface on the image side of the negative lens element in the sub-group 4b, $n_{IVbN}$ is the refractive index at the d-line of the negative lens element in the sub-group 4b, $r_{IVbN}$ is the radius of curvature of the surface on the image side of the negative lens element in the sub-group 4b, and $l_{IVa-IVb}$ is the distance from the divergent surface of the sub-group 4a to the divergent surface of the sub-group 4b.

In another preferred embodiment, the first lens group is composed of a cemented lens of a negative meniscus lens element I-1 having a convex surface directed toward the object and a positive lens element I-2, and a positive meniscus lens element I-3 having a convex surface directed toward the object; the second lens group is composed of a negative lens element II-1 having a concave surface of a strong curvature directed toward the image, a biconcave lens element II-2, and a positive lens element II-3; and the third lens group is composed of a single negative lens element.

As described later, if the stop aperture is situated in the middle of the fourth lens group as in Examples 1 and 2, it is likely that a merginal light quantity would be reduced or a diameter of the first lens group should be increased. However, according to the present invention, the first subgroup and the second subgroup of the fourth lens group are appropriately situated with a good balance in their refractive power, thereby obviating the essential defects.

BRIEF DESCRIPTION OF THE DRAWINGS

The invention will be more clearly understood from the following description in conjunction with the accompanying drawings, wherein:

FIGS. 6, 7 and 8 are graphs plotting the aberration curves obtained with the lens system of Example 2 at-the wide-angle end, middle-angle end and the telephoto end, respectively;

DETAILED DESCRIPTION OF THE PREFERRED EMBODIMENTS

Figure 1:
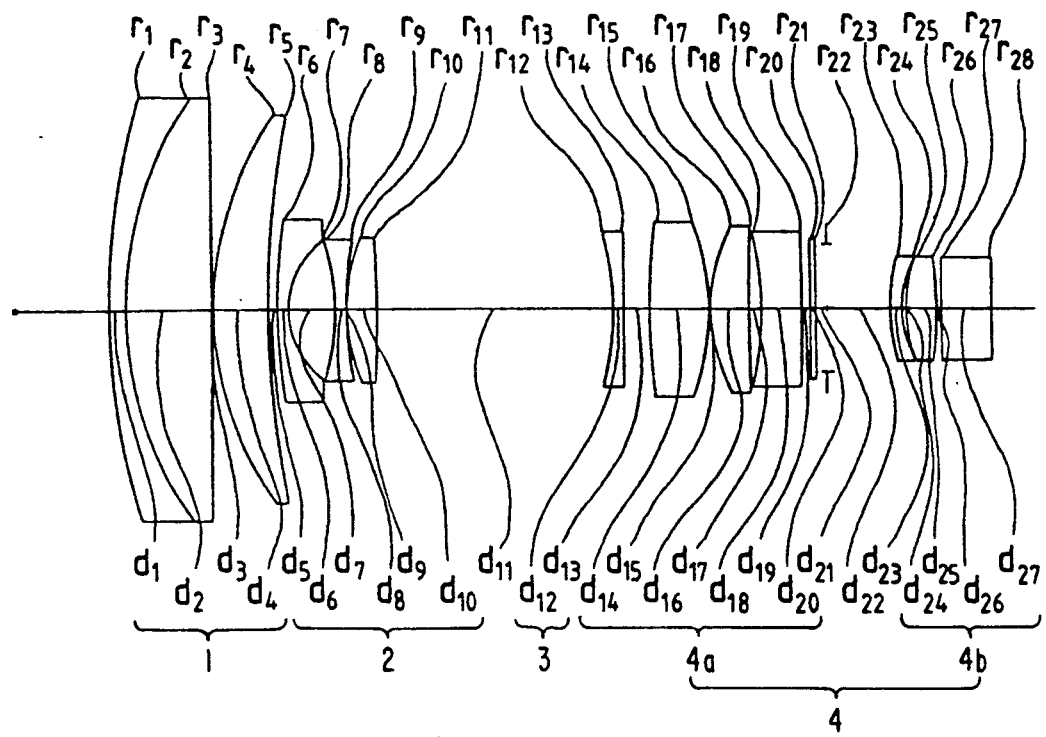
FIG. 1 is a simplified cross-sectional view of the lens system of Example 1 at the wide-angle end.
Figure 2:
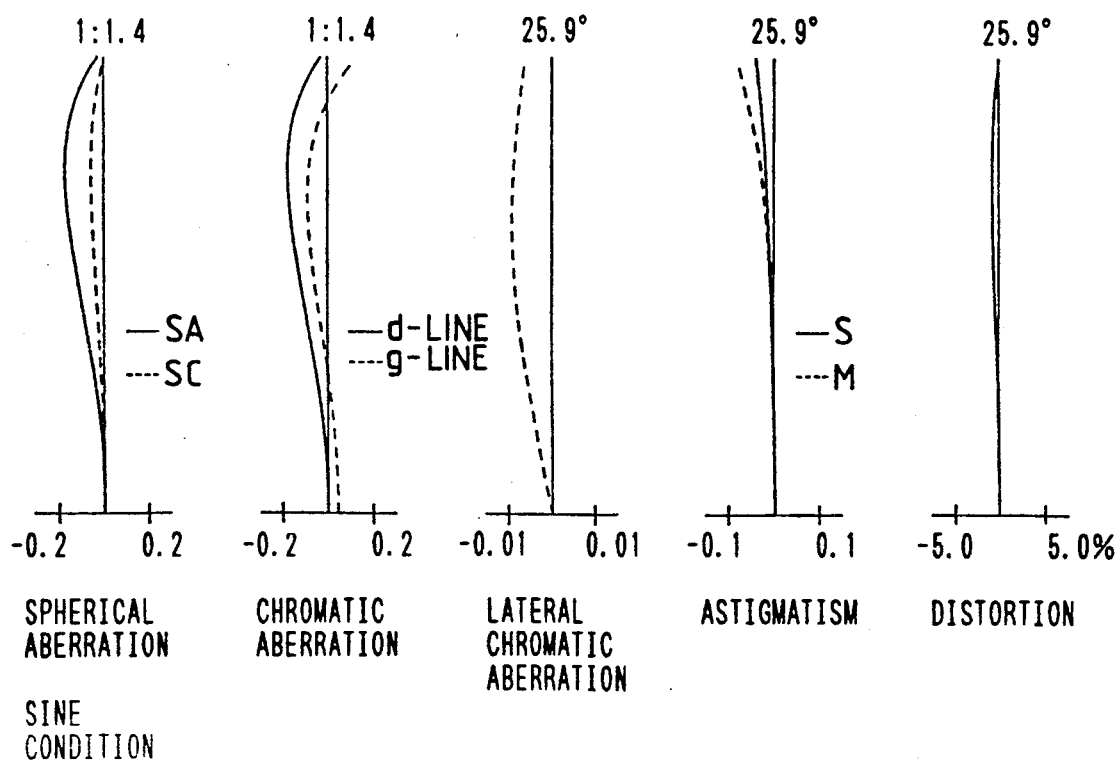
FIGS. 2, 3 and 4 are graphs plotting the aberration curves obtained with the lens system of Example 1 at the wide-angle end, middle-angle end and the telephoto end, respectively.
Figure 3:
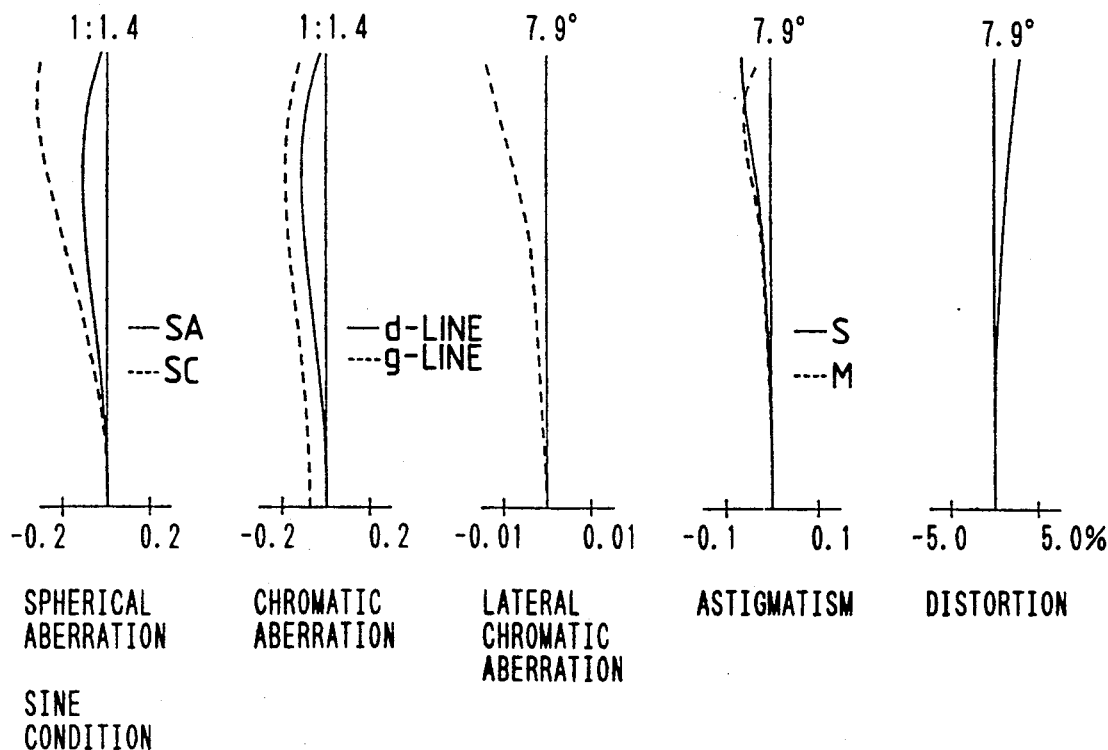
Figure 4:
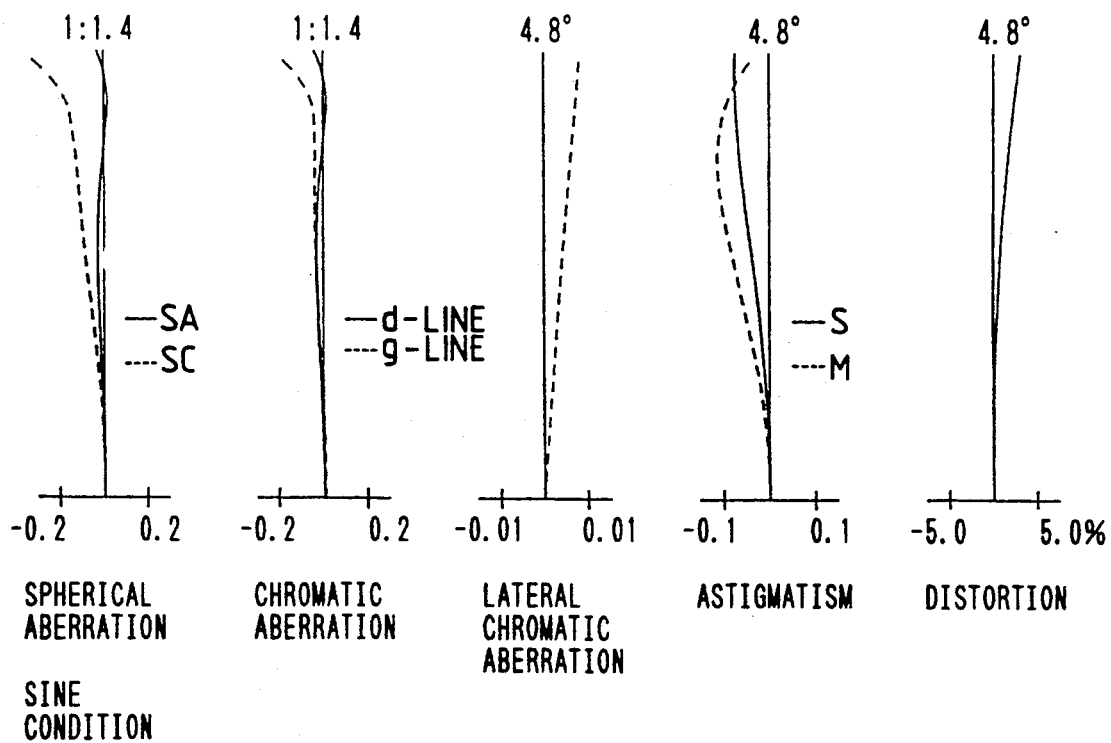
Figure 5:
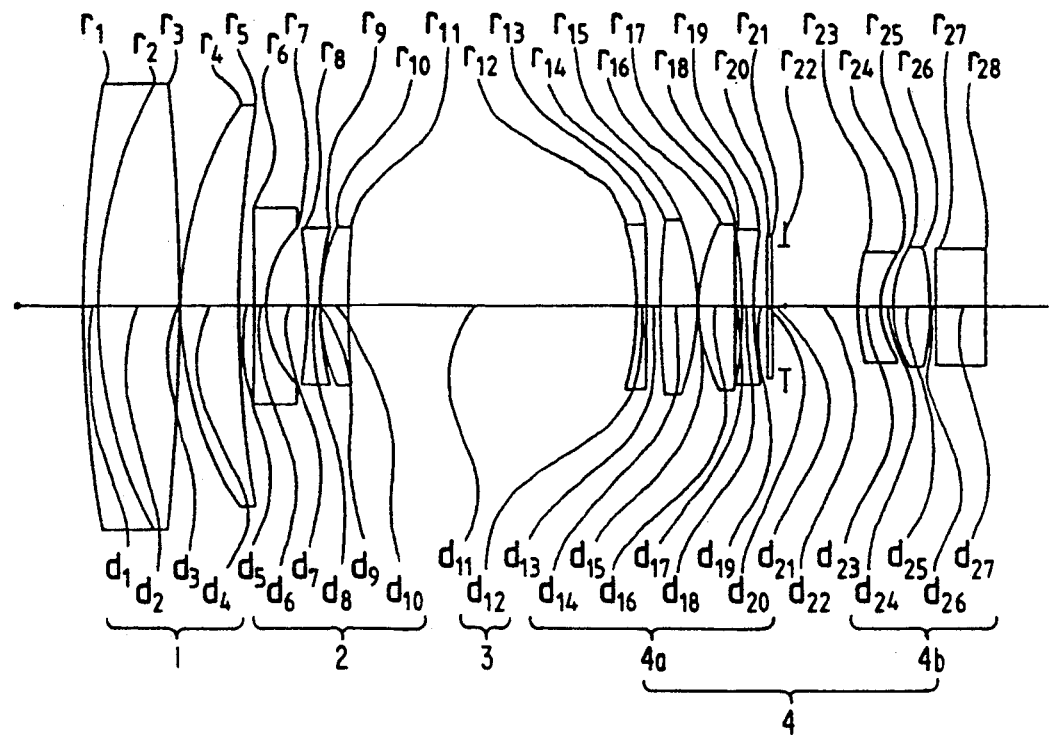
FIG. 5 is a simplified cross-sectional view of the lens system of Example 2 at the wide-angle end.
Figure 6:
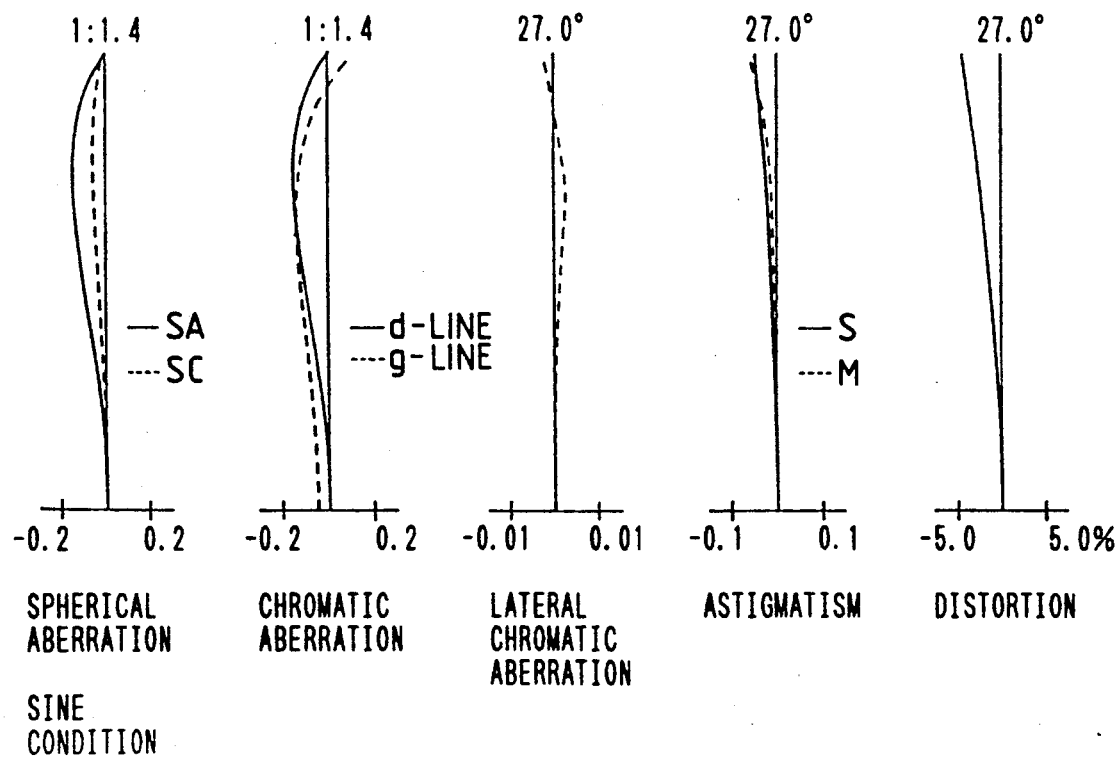
Figure 9:
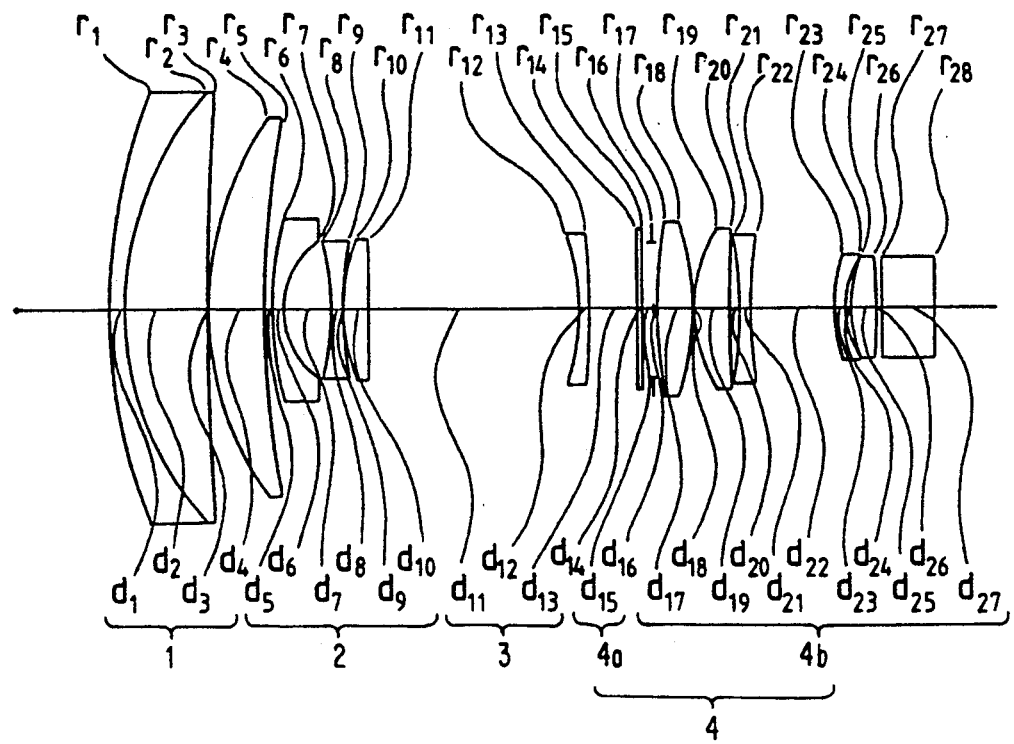
FIG. 9 is a simplified cross-sectional view of the lens system of Example 3 at the wide-angle end.
Figure 10:
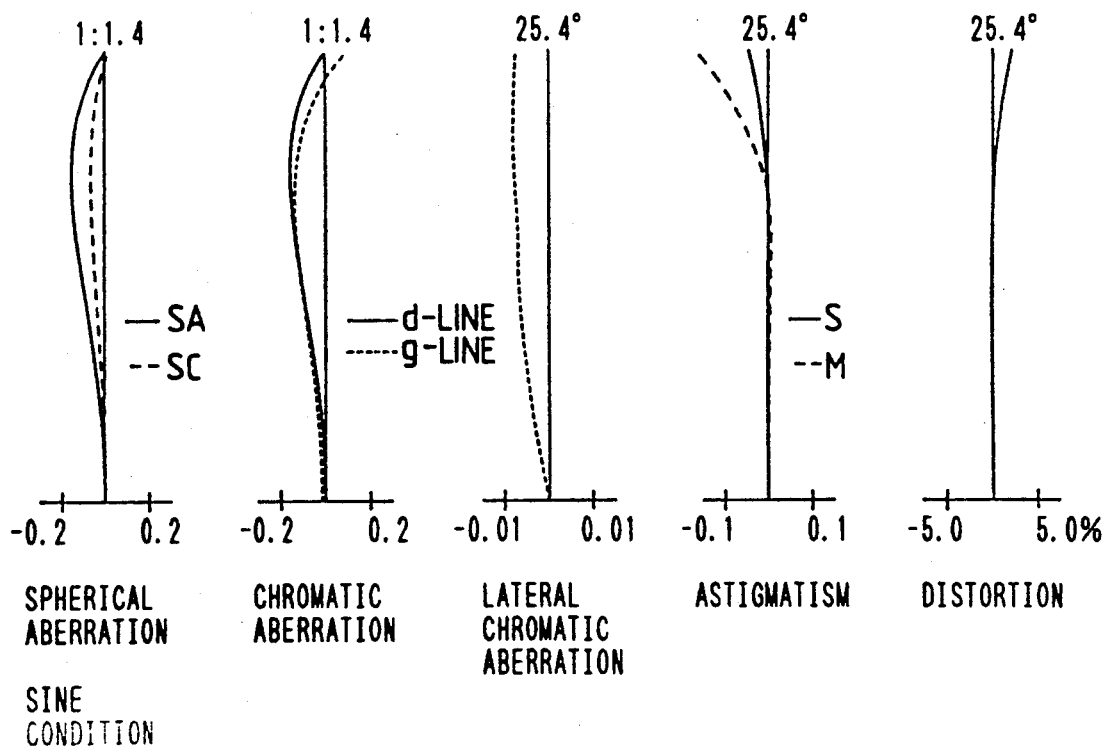
FIGS. 10, 11 and 12 are graphs plotting the aberration curves obtained with the lens system of Example 3 at the wide-angle end, middle-angle end and the telephoto end, respectively.
Figure 11:
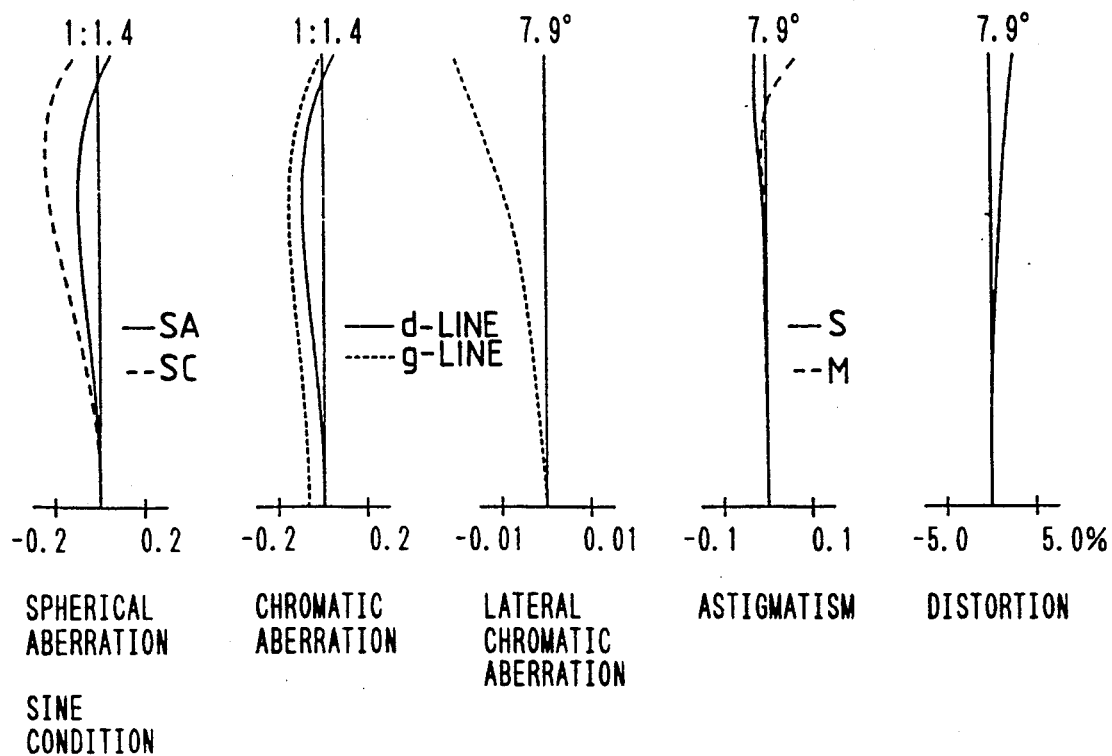
Figure 12:
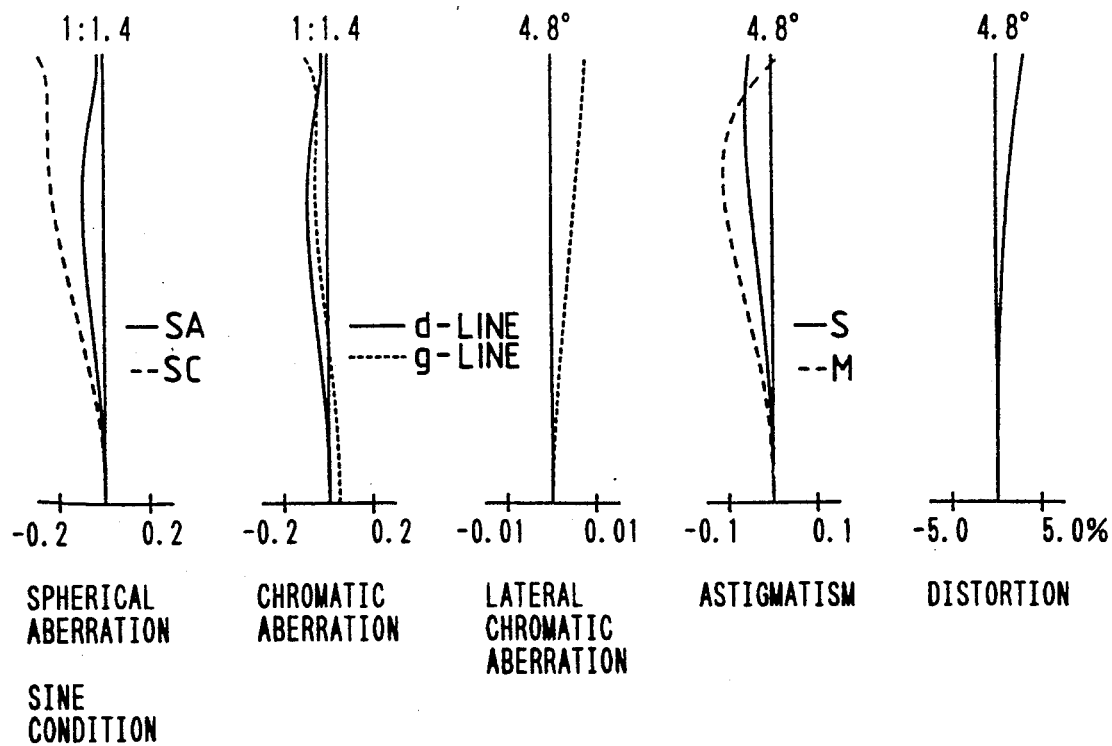

The four-group zooming lens system of the present invention satisfies the two requirements for low cost and compactness simultaneously. The fourth lens group of this system is composed of comparatively fewer lens elements than in the prior art versions. Further, the aperture is positioned in the fourth lens group closer to the image than in the prior art and yet the overall system is compact in size. Stated more specifically, the diameter of the aperture is reduced by positioning it in the fourth lens group comparatively closer to the image than in the conventionally known zoom lens systems (where the aperture is positioned either between the third and fourth lens groups or in the fourth lens group comparatively closer to the object), and this contributes to the construction of a compact and less costly zoom lens system. If the aperture is positioned closer to the image, the marginal light quantity generally tends to decrease or the diameter of the first lens group will increase, but even these problems are successfully solved by the present invention.

The conditions to be satisfied by the present invention are set forth above in the Summary of the Invention, and will now be discussed in more detail.

Condition (1) relates to the power of the fourth lens group. If the lower limit of this condition is not met, the power of the fourth lens group becomes so weak as to require increasing its size and it is impossible to realize a compact overall lens system. If the upper limit of condition (1) is exceeded, the power of the fourth lens group becomes so great as to cause aberrations in it that are too great to be effectively compensated by a reduced number of lens elements.

In the case where the stop aperture is located between the first sub-group 4a and the second sub-group 4b of the fourth group, condition (2) relates to the power of the sub-group 4a. If the lower limit of this condition is not met, the power of the sub-group 4a becomes so weak that in order to maintain the desired F number of the overall system, either the distance between the sub-groups 4a and 4b or the back focus must be increased, and this is not consistent with the objective of realizing a compact system. Further, the power of the sub-group 4b will increase and the aberrations that develop in it are too great to be effectively compensated by two lens elements. If, on the other hand, the upper limit of condition (2) is exceeded, the power of the sub-group 4a becomes very strong, which is favorable for the purpose of realizing a compact system, but then the aberrations that develop in the sub-group 4a are too great to be effectively compensated. Incidentally, if the stop aperture is provided at a front side of the fourth group, in general, the diameter of the first lens may be reduced.

Condition (3) relates directly to the position of the aperture that is used in the lens system of the present invention. In ordinary zoom lens systems, the aperture is positioned either between the third and fourth lens groups or in the fourth lens group comparatively closer to the image, but this arrangement increases the diameter of the aperture and hence is not favorable for the purpose of providing a compact and less costly system. If the lower limit of condition (3) is not reached, the overall layout resembles the prior art version. If the upper limit of this condition is exceeded, the position of the aperture is so close to the image that marginal rays will intercept the aperture at an unduly low height at a maximum view angle, and this increases the chance of reduction in the quantity of marginal light (or even vignetting) when the opening of the aperture is reduced.

Condition (4) relates to the distance between the principal points in the sub-group 4a and must be satisfied in order to prevent the reduction in the quantity of marginal light and the increase in the diameter of the front lens while the position of the aperture is maintained within the range specified by condition (3). If the upper limit of condition (4) is exceeded, a condition results that is favorable for the purpose of positioning the aperture closer to the object but, on the other hand, the thickness of the sub-group 4a becomes too great to attain the purpose of realizing a lightweight and less costly system. If the lower limit of condition (4) is not reached, it is impossible to position the aperture sufficiently closer to the object.

If one attempts not only to minimize the number of lens elements used in a lens system but also to reduce its size (i.e., make it compact), the powers of individual lens surfaces will generally increase to cause greater aberrations, particularly in a bright lens system having an F number of about 1:1.4, where it becomes difficult to achieve effective compensation for spherical aberrations. Condition (5) relates to the power of the divergent surface on the object side of the negative lens in the positive sub-group 4a, which concave surface is responsible for effective compensation for spherical aberration. If the upper limit of condition (5) is exceeded, the power of that divergent surface is too weak to achieve effective compensation for spherical aberration. If the lower limit of condition (5) is not reached, the power of the divergent surface is too strong to avoid the occurrence of higher-order aberrations.

Condition (6) relates to the power of the divergent surface on the image side of the negative lens element in the sub-group 4b. If the upper limit of this condition is exceeded, the power of the negative surface is too small to achieve effective compensation for curvature of the field and distortion. If the lower limit of condition (6) is not reached, overcompensation will occur. Condition (7) specifies the distance from the divergent surface in the sub-group 4a to the divergent surface in the sub-group 4b.

This condition should be satisfied in order to compensate for spherical aberration, curvature of the field and distortion in a balanced way. If the upper limit of this condition is exceeded, a condition will result that is favorable for the purpose of aberrational compensation but, on the other hand, the back focus is insufficient to realize a zoom lens system suitable for use with a video camera. If the lower limit of condition (7) is not reached, it becomes difficult to achieve effective compensation for various aberrations in a balanced way.

Three examples of the present invention are described below with reference to data sheets, in which $f$ denotes the focal length of the overall system, $F_{NO}$ is the F number, $\omega$ is the half view angle, $f_B$ is the back focus, $r$ is the radius of curvature of an individual surface, $d$ is the lens thickness or the aerial distance between lenses, $n$ is the refractive index of an individual lens at the d-line, and $\nu$ is the Abbe number of an individual lens. The data includes a filter ($r_{20}$, $r_{21}$) and a cover glass ($r_{27}$, $r_{28}$), and aberrational compensation is performed on the entire system including the filter and the cover glass.

EXAMPLE 1

$F_{NO} = 1{:}1.4 \quad f = 8.24 \sim 46.56$
$\omega = 25.9 \sim 4.8 \quad f_B = 7.7$

| Surface No. | r | d | n | ν |
|---|---|---|---|---|
| 1 | 64.302 | 1.50 | 1.80518 | 25.4 |
| 2 | 32.794 | 8.06 | 1.60311 | 60.7 |
| 3 | −2218.267 | 0.10 | | |
| 4 | 29.816 | 5.17 | 1.69680 | 55.5 |
| 5 | 89.310 | $d_5$ | | |
| 6 | 53.839 | 1.00 | 1.77250 | 49.6 |
| 7 | 8.180 | 4.25 | | |
| 8 | −22.220 | 1.00 | 1.77250 | 49.6 |
| 9 | 33.489 | 0.10 | | |
| 10 | 18.842 | 2.69 | 1.84666 | 23.9 |
| 11 | −132.129 | $d_{11}$ | | |
| 12 | −27.391 | 1.00 | 1.76182 | 26.5 |
| 13 | 8843.326 | $d_{13}$ | | |
| 14 | 55.233 | 5.50 | 1.77250 | 49.6 |
| 15 | −21.688 | 0.10 | | |
| 16 | 15.967 | 3.47 | 1.65160 | 58.5 |
| 17 | 278.837 | 1.18 | | |
| 18 | −28.952 | 3.70 | 1.80518 | 25.4 |
| 19 | −294.547 | 0.77 | | |
| 20 | ∞ | 0.50 | 1.51633 | 64.1 |
| 21 | ∞ | 0.40 | | |
| 22 | aperture | 6.42 | | |
| 23 | 19.433 | 1.00 | 1.80518 | 25.4 |
| 24 | 9.628 | 0.39 | | |
| 25 | 12.472 | 2.73 | 1.69680 | 55.5 |
| 26 | −38.351 | 0.50 | | |
| 27 | ∞ | 4.70 | 1.49782 | 66.8 |
| 28 | ∞ | | | |

Variable Distances

| | $d_5$ | $d_{11}$ | $d_{13}$ |
|---|---|---|---|
| f = 8.24 | 0.80 | 21.88 | 2.38 |
| f = 28.00 | 18.18 | 2.88 | 4.00 |
| f = 46.56 | 22.42 | 1.76 | 0.88 |

(1) $\dfrac{f_W}{f_{IV}} = 0.528$ (2) $\dfrac{f_{IV}}{f_{IVa}} = 1.060$ (3) $\dfrac{d_{IV1-A}}{f_W} = 1.896$ (4) $\dfrac{HH_{IVa}}{f_W} = 0.694$ (5) $\dfrac{f_{IV}}{f_{IVaN}} = -0.434$ (6) $\dfrac{f_{IV}}{f_{IVbN}} = -1.304$ (7) $\dfrac{l_{IVa-IVb}}{f_W} = 1.552$

EXAMPLE 2

$F_{NO} = 1{:}1.4 \quad f = 8.20 \sim 46.80$
$\omega = 27.0 \sim 4.7 \quad f_B = 5.9$

| Surface No. | r | d | n | ν |
|---|---|---|---|---|
| 1 | 106.783 | 1.50 | 1.80518 | 25.4 |
| 2 | 40.249 | 7.65 | 1.60311 | 60.7 |
| 3 | −177.604 | 0.10 | | |
| 4 | 32.010 | 5.32 | 1.69680 | 55.5 |
| 5 | 98.446 | $d_5$ | | |
| 6 | −407.260 | 1.00 | 1.77250 | 49.6 |
| 7 | 10.496 | 3.80 | | |
| 8 | −40.111 | 1.00 | 1.65160 | 58.5 |
| 9 | 25.806 | 0.10 | | |
| 10 | 17.639 | 2.51 | 1.84666 | 23.9 |
| 11 | 70.991 | $d_{11}$ | | |
| 12 | −25.926 | 1.00 | 1.48749 | 70.2 |
| 13 | −672.590 | $d_{13}$ | | |
| 14 | 61.746 | 3.44 | 1.69680 | 55.5 |
| 15 | −21.022 | 0.10 | | |
| 16 | 15.532 | 3.34 | 1.77250 | 49.6 |
| 17 | −301.571 | 0.68 | | |
| 18 | −38.376 | 1.00 | 1.80518 | 25.4 |
| 19 | 42.543 | 1.23 | | |
| 20 | ∞ | 0.50 | 1.51633 | 64.1 |
| 21 | ∞ | 0.40 | | |
| 22 | aperture | 7.45 | | |
| 23 | 20.574 | 2.07 | 1.84666 | 23.9 |
| 24 | 8.254 | 1.13 | | |
| 25 | 10.629 | 3.37 | 1.69680 | 55.5 |
| 26 | −24.833 | 0.50 | | |
| 27 | ∞ | 4.70 | 1.49782 | 66.8 |
| 28 | ∞ | | | |

Variable Distances

| | $d_5$ | $d_{11}$ | $d_{13}$ |
|---|---|---|---|
| f = 8.20 | 1.50 | 26.45 | 1.24 |
| f = 28.00 | 20.43 | 3.52 | 5.25 |
| f = 46.80 | 25.00 | 3.50 | 0.70 |

(1) $\dfrac{f_W}{f_{IV}} = 0.474$ (2) $\dfrac{f_{IV}}{f_{IVa}} = 1.134$ (3) $\dfrac{d_{IV1-A}}{f_W} = 1.303$ (4) $\dfrac{HH_{IVa}}{f_W} = 0.465$ (5) $\dfrac{f_{IV}}{f_{IVaN}} = -0.363$ (6) $\dfrac{f_{IV}}{f_{IVbN}} = -1.774$ (7) $\dfrac{l_{IVa-IVb}}{f_W} = 1.542$

EXAMPLE 3

$F_{NO} = 1{:}1.4 \quad f = 8.24 \sim 46.56$
$\omega = 25.4 \sim 4.8 \quad f_B = 6.5$

| Surface No. | r | d | n | ν |
|---|---|---|---|---|
| 1 | 50.496 | 1.50 | 1.80518 | 25.4 |

EXAMPLE 3-continued

| | | | | |
|---|---|---|---|---|
| 2 | 28.029 | 7.77 | 1.60311 | 60.7 |
| 3 | 271.301 | 0.10 | | |
| 4 | 28.624 | 5.15 | 1.69680 | 55.5 |
| 5 | 85.195 | $d_5$ | | |
| 6 | 31.481 | 1.00 | 1.77250 | 49.6 |
| 7 | 7.720 | 4.43 | | |
| 8 | −23.298 | 1.00 | 1.77250 | 49.6 |
| 9 | 30.825 | 0.10 | | |
| 10 | 17.222 | 2.33 | 1.84666 | 23.9 |
| 11 | −3883.820 | $d_{11}$ | | |
| 12 | −21.420 | 1.00 | 1.76182 | 26.5 |
| 13 | −69.988 | $d_{13}$ | | |
| 14 | ∞ | 0.50 | 1.51633 | 64.1 |
| 15 | ∞ | 0.40 | | |
| 16 | aperture | 1.00 | | |
| 17 | 43.079 | 3.45 | 1.77250 | 49.6 |
| 18 | −12.369 | 0.10 | | |
| 19 | 13.639 | 3.23 | 1.69680 | 55.5 |
| 20 | 120.812 | 0.93 | | |
| 21 | −39.961 | 1.00 | 1.80518 | 25.4 |
| 22 | 43.056 | 7.73 | | |
| 23 | 15.111 | 1.00 | 1.80518 | 25.4 |
| 24 | 8.249 | 0.53 | | |
| 25 | 11.625 | 2.32 | 1.69680 | 55.5 |
| 26 | −66.441 | 0.50 | | |
| 27 | ∞ | 4.70 | 1.49782 | 66.8 |
| 28 | ∞ | | | |

Variable Distances

| | $d_5$ | $d_{11}$ | $d_{13}$ |
|---|---|---|---|
| f = 8.24 | 0.80 | 19.49 | 4.44 |
| f = 28.00 | 17.27 | 2.07 | 5.40 |
| f = 46.56 | 21.18 | 2.80 | 0.75 |

(1) $\dfrac{f_W}{f_{IV}} = 0.569$ (2) $\dfrac{f_{IV}}{f_{IVa}} = 0.994$ (3) $\dfrac{f_{IV}}{f_{IVaN}} = -0.292$ (4) $\dfrac{f_{IV}}{f_{IVbN}} = -1.413$ (5) $\dfrac{l_{IVa-IVb}}{f_W} = 1.181$

What is claimed is:

1. In a zoom lens system which comprises, in order from the object side, a first lens group having a positive refractive power that moves along the optical axis for focusing, a second lens group having a negative refraction power that moves along the optical axis for zooming, a third lens group having negative refractive power that moves along the optical axis for compensating for the image plane that varies upon zooming, and a fixed, imaging fourth lens group having a positive refractive power, the improvement wherein the fourth lens group has a variable aperture for variable controlling the amount of light that passes therethrough and comprises a first sub-group having a positive refractive power that is situated closer to the object than the aperture and a second sub-group having a positive refractive power that is situated closer to the image than the aperture and wherein the first sub-group is composed of at least two positive lens elements and at least one negative lens element.

2. A zoom lens system according to claim 1 wherein the second sub-group comprises, in order from the object side, a negative meniscus lens having a convex surface directed toward the object and a biconvex positive lens element.

3. A zoom lens system according to claim 1, wherein said first lens group comprises a cemented lens of a negative meniscus lens element having a convex surface directed toward the object and a positive lens element, and a positive meniscus lens element having a convex surface directed toward the object; said second lens group comprises a negative lens element having a concave surface of a strong curvature directed toward the image, a biconcave lens element, and a positive lens element; and said third lens group comprises a single negative lens element.

4. In a zoom lens system which comprises, in order from the object side, a first lens group having a positive refractive power that moves along the optical axis for focusing, a second lens group having a negative refraction power that moves along the optical axis for zooming, a third lens group having a negative refractive power that moves along the optical axis for compensating for the image plane that varies upon zooming, and a fixed, imaging fourth lens group having a positive refractive power, the improvement wherein the fourth lens group has a variable aperture for variable controlling the amount of light that passes therethrough and comprises a first sub-group having a positive refractive power that is situated closer to the object than the aperture and a second sub-group having a positive refractive power that is situated closer to the image than the aperture and wherein said fourth lens group further satisfies the following conditions:

$$0.3 < \frac{f_W}{f_{IV}} < 0.7 \quad (1)$$

$$0.9 < \frac{f_{IV}}{f_{IVa}} < 1.3 \quad (2)$$

$$1.0 < \frac{d_{IV1-A}}{f_W} < 2.3 \quad (3)$$

$$0.4 < \frac{HH_{IVa}}{f_W} < 0.9 \quad (4)$$

where $f_W$ is the focal length of the overall system at the wide-angle end, $f_{IV}$ is the focal length of the fourth lens group $f_{IVa}$ is the focal length of the first sub-group, $d_{IV1-A}$ is the distance from the first surface of first sub-group to the aperture, and $HH_{IVa}$ is the distance between the principal points in the first sub-group of the fourth lens group.

5. In a zoom lens system which comprises, in order from the object side, a first lens group having a positive refractive power that moves along the optical axis for focusing, a second lens group having a negative refraction power that moves along the optical axis for zooming, a third lens group having a negative refractive power than moves along the optical axis for compensating for the imaging plane that varies upon zooming, and a fixed, imaging fourth lens group having a positive refractive power, the improvement wherein the fourth lens group has a variable aperture for variable controlling the amount of light that passes therethrough and comprises a first sub-group having a positive refractive power that is situated closer to the object than the aperture and a second sub-group having a positive refractive power that is situated closer to the image than the aperture, wherein the first sub-group comprises, in order from the object side, a positive lens element having a convex surface of a strong curvature directed toward the image, a positive lens element having a convex surface of a strong curvature directed toward the object, and a negative lens element having a concave surface of a strong curvature directed toward the object.

6. A zoom lens system according to claim 5, wherein said first sub-group satisfies the following condition:

$$-0.6 < \frac{f_{IV}}{f_{IVaN}} < -0.2 \quad (5)$$

where $$\frac{1}{f_{IVaN}} = \frac{n_{IVaN} - 1}{r_{IVaN}}$$

is the power of the divergent surface on the object side of the negative lens element in the first sub-group, $n_{IVaN}$ is the refractive index at the d-line of the negative lens element in the first sub-group, and $r_{IVaN}$ is the radius of curvature of the surface on the object side of the negative lens element in the first sub-group.

7. In a zoom lens system which comprises, in order from the object side, a first lens group having a positive refractive power that moves along the optical axis for focusing, a second lens group having a negative refraction power that moves along the optical axis for zooming, a third lens group having a negative refractive power that moves along the optical axis for compensating for the image plane that varies upon zooming, and a fixed, imaging fourth lens group having a positive refractive power, the improvement wherein the fourth lens group has a variable aperture for variable controlling the amount of light that passes therethrough and comprises a first sub-group having a positive refractive power that is situated closer to the object than the aperture and a second sub-group having a positive refractive power that is situated closer to the image than the aperture, wherein the second sub-group comprises, in order from the object side, a negative meniscus lens having a convex surface directed toward the object and a biconvex positive lens element, wherein said second lens sub-group satisfies the following conditions:

$$-2.0 < \frac{f_{IV}}{f_{IVbN}} < -1.0 \quad (6)$$

$$1.0 < \frac{l_{IVa-IVb}}{f_W} < 2.0 \quad (7)$$

where $$\frac{1}{f_{IVbN}} = \frac{1 - n_{IVbN}}{r_{IVbN}}$$

is the power of the divergent surface on the image side of the negative lens element in the second sub-group, $n_{IVbN}$ is the refractive index at the d-line of the negative lens element is the second sub-group, $r_{IVbN}$ is the radius of curvature of the surface on the image side of the negative lens element in the second sub-group, and $l_{IVa-IVb}$ is the distance from the divergent surface of the first sub-group to the divergent surface of the second sub-group.

8. In a zoom lens system which comprises, in order from the object side, a first lens group having a positive refractive power that moves along the optical axis for focusing, a second lens group having a negative refractive power that moves along the optical axis for zooming, a third lens group having a negative refractive power that moves along the optical axis for compensating for the image plane that varies upon zooming, and a fixed, imaging fourth lens group having a positive refractive power, the improvement wherein the fourth lens group has a variable aperture for variable controlling the amount of light that passes therethrough and comprises a first sub-group having a positive refractive power and a second sub-group having a positive refractive power, and wherein the first sub-group comprises, in order from the object side, a positive lens element having a convex surface of a strong curvature directed toward the image, a positive lens element having a convex surface of a strong curvature directed toward the object, and a negative lens element having a concave surface of a strong curvature directed toward the object, and wherein said first sub-group satisfies the following condition:

$$-0.6 < \frac{f_{IV}}{f_{IVaN}} < -0.2 \quad (5)$$

where $$\frac{1}{f_{IVaN}} = \frac{n_{IVaN} - 1}{r_{IVaN}}$$

is the power of the divergent surface of the object side of the negative lens element in the first sub-group, $n_{IVaN}$ is the refractive index at the d-line of the negative lens element in the first sub-group, and $r_{IVaN}$ is the radius of curvature of the surface on the object side of the negative lens element in the first sub-group.

9. A zoom lens system according to claim 8 wherein the second sub-group comprises, in order from the object side, a negative meniscus lens having a convex surface directed toward the object and a biconvex positive lens element.

10. A zoom lens system according to claim 8, wherein said first lens group comprises a cemented lens of a negative meniscus lens element having a convex surface directed toward the object and a positive lens element, and a positive meniscus lens element having a convex surface directed toward the object; said second lens group comprises a negative lens element having a concave surface of a strong curvature directed toward the image, a biconcave lens element, and a positive lens element; and said third lens group comprises a signal negative lens element.

11. In a zoom lens system which comprises, in order from the object side, a first lens group having a positive refractive power that moves along the optical axis for focusing, a second lens group having a negative refractive power that moves along the optical axis for zooming, a third lens group having a negative refractive power that moves along the optical axis for compensating for the image plane that varies upon zooming, and a fixed, imaging fourth lens group having a positive refractive power, the improvement wherein the fourth lens group has a variable aperture for variable controlling the amount of light that passes therethrough and comprises a first sub-group having a positive refractive power and a second sub-group having a positive refractive power and wherein said fourth lens group further satisfies the following conditions:

$$0.3 < \frac{f_W}{f_{IV}} < 0.7 \quad (1)$$

$$0.9 < \frac{f_{IV}}{f_{IVa}} < 1.3 \quad (2)$$

where $f_W$ is the focal length of the overall system at the wide-angel end, $f_{IV}$ is the focal length of the fourth lens group, and $f_{IVa}$ is the focal length of the first sub group.

12. In a zoom lens system which comprises, in order from the object side, a first lens group having a positive refractive power that moves along the optical axis for focusing, a second lens group having a negative refractive power that moves along the optical axis for zooming, a third lens group having a negative refractive power that moves along the optical axis for compensating for the image plane that varies upon zooming, and a fixed, imaging fourth lens group having a positive refractive power, the improvement wherein the fourth lens group has a variable aperture for variable controlling the amount of light that passes therethrough and comprises a first sub-group having a positive refractive power and a second sub-group having a positive refractive power, wherein the second sub-group comprises, in order from the object side, a negative meniscus lens having a convex surface directed toward the object and a biconvex positive lens element, and wherein said first lens sub-group satisfies the following conditions:

$$-2.0 < \frac{f_{IV}}{f_{IVbN}} < -1.0 \quad (6)$$

where $$\frac{1}{f_{IVbN}} = \frac{1 - n_{IVbN}}{r_{IVbN}}$$

is the power of the divergent surface on the image side of the negative lens element in the second sub-group, $n_{IVbN}$ is the refractive index at the d-line of the negative lens element in the second sub-group, and $r_{IVbN}$ is the radius of curvature of the surface on the image side of the negative lens element in the second sub-group.

13. In a zoom lens system which comprises, in order from the object side, a first lens group having a positive refractive power that moves along the optical axis for focusing, a second lens group having a negative refractive power that moves along the optical axis for zooming, a third lens group having a negative refractive power that moves along the optical axis for compensating for the image plane that varies upon zooming, and a fixed, imaging fourth lens group having a positive refractive power, the improvement wherein the fourth lens group has a variable aperture for variable controlling the amount of light that passes therethrough and comprises a first sub-group having a positive refractive power and a second sub-group having a positive refractive power, wherein the second sub-group comprises, positive refractive power, wherein the second sub-group comprises, in order from the object side, a negative meniscus lens having a convex surface directed toward the object and a biconvex positive lens element, and wherein said first lens sub-group satisfies the following condition:

$$1.0 < \frac{l_{IVa-IVb}}{f_W} < 2.0 \quad (7)$$

where $l_{IVa-IVb}$ is the distance from the divergent surface of the first sub-group to the divergent surface of the second sub-group.

* * * * *

UNITED STATES PATENT AND TRADEMARK OFFICE
CERTIFICATE OF CORRECTION

PATENT NO. : 5,221,995

DATED : June 22, 1993

INVENTOR(S) : Shuji Yoneyama

It is certified that error appears in the above-identified patent and that said Letters Patent is hereby corrected as shown below:

On the title page; Item [19] and item,
[75] Inventor: "Shuhji Yaneyama", insert --Shuhji Yoneyama--.

Signed and Sealed this

Twenty-eight Day of February, 1995

Attest:

BRUCE LEHMAN

*Attesting Officer*          *Commissioner of Patents and Trademarks*